United States Patent [19]
Wheeler et al.

[11] 4,271,913
[45] Jun. 9, 1981

[54] ARTICULATED PLOW WITH HORIZONTAL ANGULARITY BETWEEN ITS FRAMES

[75] Inventors: Keith A. Wheeler; Dawson W. Hastings, both of La Porte, Ind.

[73] Assignee: Allis-Chalmers Corporation, Milwaukee, Wis.

[21] Appl. No.: 54,645

[22] Filed: Jul. 2, 1979

[51] Int. Cl.³ .............................................. A01B 65/02
[52] U.S. Cl. .................................. 172/633; 172/314; 172/741
[58] Field of Search ............... 172/633, 623, 741, 774, 172/695, 647, 310, 311, 314

[56] References Cited
U.S. PATENT DOCUMENTS

| | | | |
|---|---|---|---|
| 3,965,989 | 6/1976 | Ward | 172/695 X |
| 4,036,306 | 7/1977 | Kinzenbaw | 172/647 X |
| 4,049,063 | 9/1977 | Dietrich | 172/647 X |
| 4,060,254 | 11/1977 | Ernst | 172/741 X |
| 4,121,852 | 10/1978 | Quanbeck | 172/633 X |

*Primary Examiner*—George J. Marlo

[57] ABSTRACT

The horizontal diagonal angle (z) of the rear frame (16) of an articulated plow (11) is greater than the horizontal diagonal angle (y) of the front frame (14), thus providing a lead angle (x) between the frames (14, 16). This construction reduces the overcut by the plow bottoms (17) that would otherwise occur due to the lateral flexing of the rear frame (16). The lead angle (x) can be adjusted between predetermined minimum and maximum values by moving an eccentric (51) between predetermined positions of pivotal adjustment. The eccentric (51) is part of a pivot joint (33) which together with a pivot joint (32) establishes the transverse pivot axis (31) between the articulated plow sections (12, 13).

5 Claims, 8 Drawing Figures

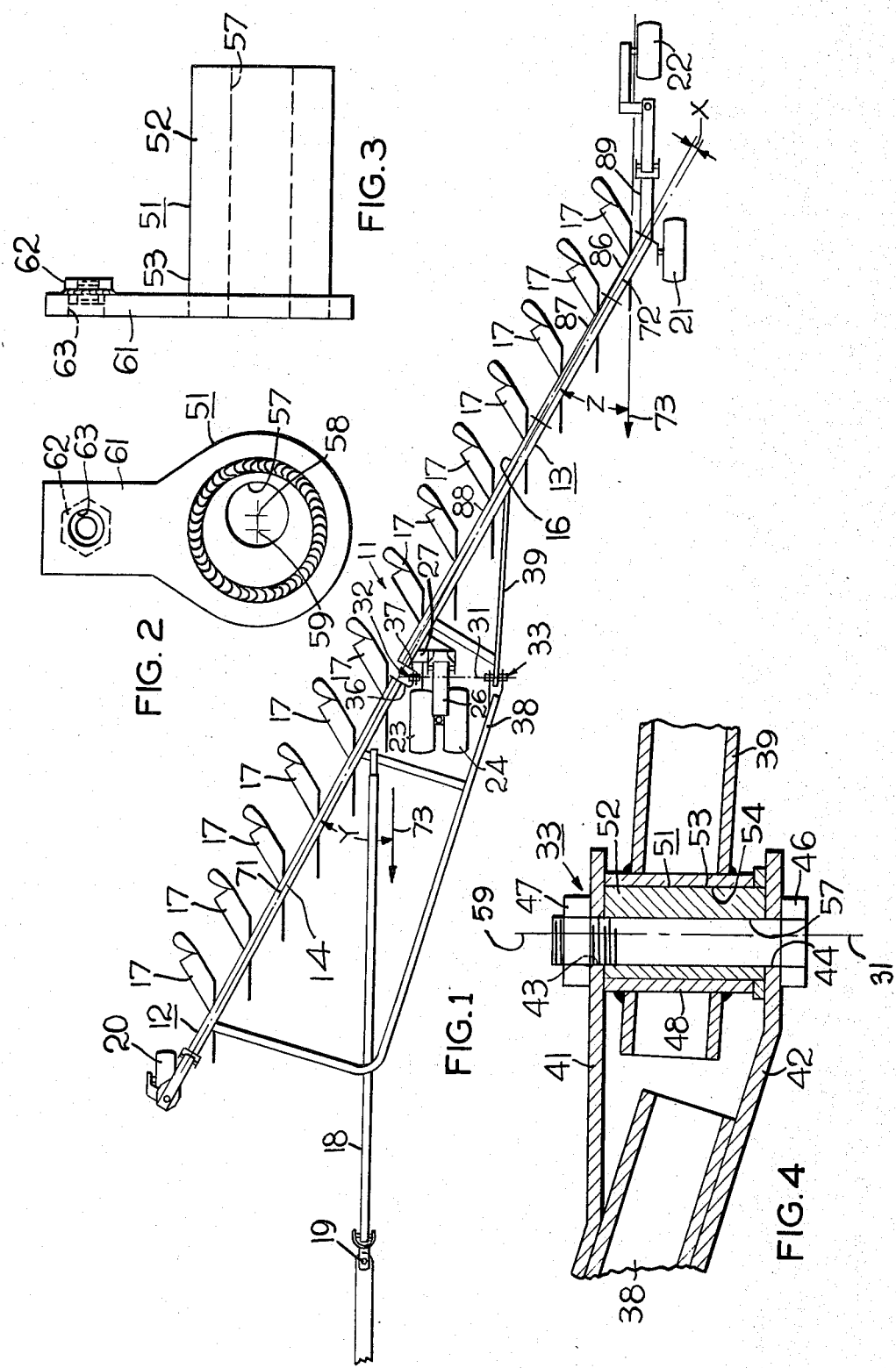

ARTICULATED PLOW WITH HORIZONTAL ANGULARITY BETWEEN ITS FRAMES

TECHNICAL FIELD

This invention relates to an articulated plow having front and rear sections with diagonal frames pivotally connected on a horizontal transverse axis and more particularly to positioning the rear section frame at a greater horizontal angle to the direction of plowing movement than the front section frame so that when the rear section deflects horizontally under plowing load its frame will be disposed at approximately the same horizontal angle as the front section frame. This invention minimizes overcut of the plow.

BACKGROUND OF THE INVENTION

Heretofore, various articulated plows have been suggested and used for agricultural purposes. Articulation of front and rear plow frame sections about a transverse axis helps maintain a reasonable depth of plowing as the plow traverses uneven ground contour. Typical of such articulated plows are those illustrated in U.S. Pat. Nos. 3,965,989; 4,036,306; 4,049,063; and 4,121,852. It has been found that the rear frame of an articulated plow tends to deflect horizontally under load with the rear end thereof moving laterally relative to its front end. This changes the cutting angle of the plow bottoms on the rear section which results in "overcutting" of the calculated width of cut. The increase in side draft in the rear section causes the entire plow to swing clockwise about the vertical hitch axis between the plow and the pulling tractor. The net result is an overcut, that is, the plow is plowing a wider width of land than desired. The present invention is directed toward positioning the rear plow frame at a slight horizontal angle with relation to the front frame so that when it deflects under the forces encountered in a plowing operation, the rear frame will have approximately the same horizontal angle relationship to the direction of plowing as the front section. In other words, the object of this invention is to provide a sufficient lead angle in the rear frame so that during plowing the lead angle will be approximately zero.

BRIEF DESCRIPTION OF THE INVENTION

An articulated plow has front and rear sections pivotally interconnected on a horizontal transverse pivot axis. The front and rear sections have diagonally disposed frames to which plow bottoms are connected at predetermined intervals. The rear section frame is disposed at a small horizontal angle to the front frame so that when subjected to plowing forces it will deflect to substantially the same horizontal angle as the front section frame, thereby minimizing overcut of the plow.

The plow sections may be pivotally interconnected by a pair of laterally spaced pivot joints and one of the pivot joints may include means permitting adjustment in the fore and aft direction so as to change the angle of the rear frame relative to the front frame.

BRIEF DESCRIPTION OF THE DRAWINGS

The invention is illustrated by drawings in which:

FIG. 1 is a partial top view of an articulated plow incorporating the present invention;

FIG. 2 is a side view of an eccentric bushing used in the present invention;

FIG. 3 is an end view of the eccentric bushing shown in FIG. 2;

FIG. 4 is a sectional view taken on the line IV—IV in FIG. 5;

DETAILED DESCRIPTION OF THE INVENTION

Figure 7:
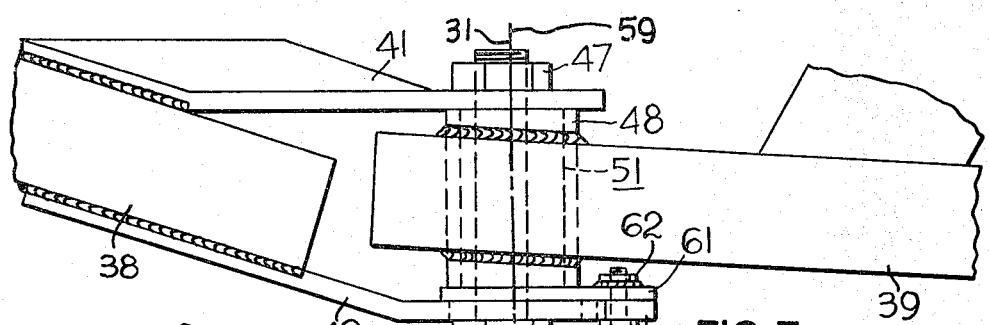
FIG. 7 is a top view of the pivot joint shown in FIG. 6.

Referring to FIG. 1, an articulated plow 11 includes a front section 12 and a rear section 13 having diagonal main frames in the form of box section beams or tubes 14, 16. Plow bottoms 17 are rigidly mounted at predetermined intervals on each of the main frames 14, 16. The plow bottoms 17 are identical in construction and are each secured to their respective frames 14, 16 by identical fastening means. Thus, the plow bottoms have the same horizontal angle relationship to their frames. A pull bar 18 is provided on the plow 11 for connecting same in draft relation to a tractor (not shown). The pull bar 18 is connected to the tractor draw bar by a vertical pivot pin 19. The front of the front section 12 is supported by a suitable ground engaging wheel 20. The rear of the rear section 13 is supported by a ground engaging wheel 21 and by a furrow wheel 22. The central part of the articulated plow 11 is supported by dual wheels 23, 24 carried by a linkage 26 mounted on a bracket structure 27 on the front of the rear section 13. The front and rear sections 12, 13 are connected to one another on a horizontal transverse pivot axis 31 by transversely spaced pivot joints 32, 33. Pivot joint 32 pivotally interconnects a bracket 36 welded to the rear end of the front frame 14 and a bracket 37 welded to the front end of rear frame 16. The pivot joint 33 pivotally interconnects a draft frame member 38 on the front section 12 and a draft frame member 39 on the rear section 13. Referring also to FIG. 4, showing the pivot joint 33 in section, a pair of laterally spaced brackets 41, 42 are secured as by welding to the draft member 38 and have aligned transverse bores 43, 44 for receiving a pivot pin in the form of a bolt 46 secured in place by nut 47. A transversely disposed cylindrical sleeve or bushing 48 is welded to draft member 39 and is disposed between the brackets 41, 42 of draft member 38. An eccentric 51, illustrated in detail in FIGS. 2 and 3, includes a bushing 52 having an outer cylindrical surface 53 in bearing engagement with a radially inward facing cylindrical bearing surface 54 on the bushing 48 carried by the draft member 39. The bolt 46 passes through a cylindrical opening or bore defined by cylindrical surface 57 whose axis 58 is offset from the axis 59 of the outer cylindrical surface 53 of the eccentric bushing 52. A lever arm 61 is welded to one axial end of the bushing 52 and carries a nut 62 near its outer end which is secured thereto as by welding and is aligned with an opening 63.

Figure 5:
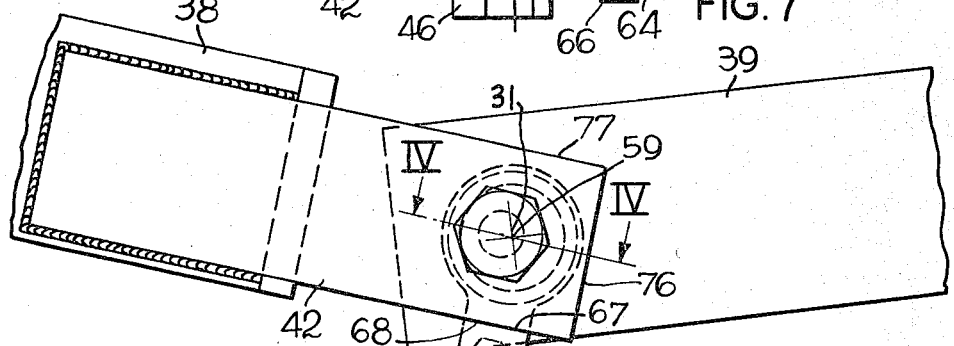
FIG. 5 is an enlarged side view of an eccentric pivot joint used in the present invention.
Figure 6:
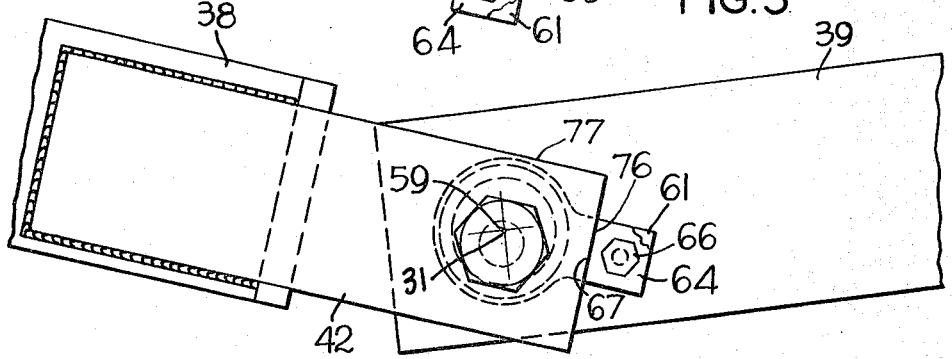
FIG. 6 is an enlarged side view of the pivot joint with the eccentric rotated in an intermediate position of adjustment.
Figure 8:
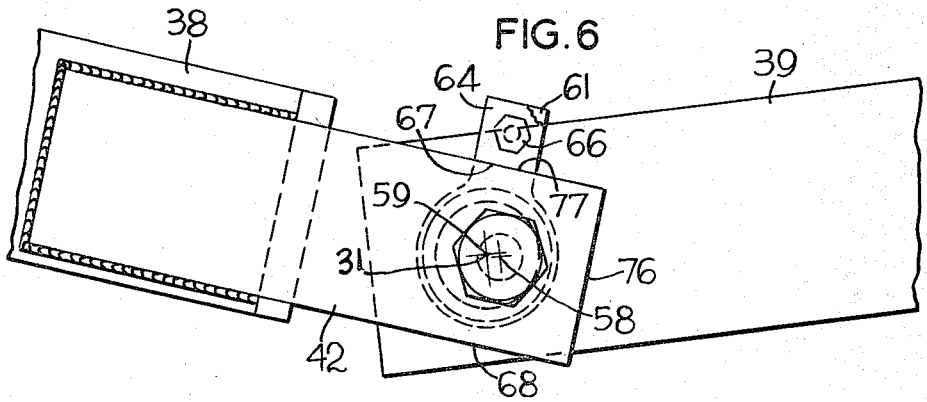
FIG. 8 is a side view similar to FIGS. 5 and 6, but showing the eccentric bushing positioned ninety degrees from the position shown in FIGS. 6 and 7.

As illustrated in FIGS. 1, 4 and 5, the lever arm 61 is disposed below the pivot axis 59 of the pivot joint 33, which is coaxial with axis 31 of pivotal movement between the front and rear sections 12, 13. The eccentric 51 is maintained in that position by a block 64 secured to the lever arm 61 by a capscrew 66. In this position, surface 67 of block 64 engages bottom surface 68 of the bracket 42 of draft member 38 and the rear frame 16 is positioned at the minimum angle of adjustment clockwise about the pivot joint 32 as viewed in FIG. 1. The brackets 36 and 37 are so designed to permit the rear frame 16 to swing horizontally about pivot joint 32 when the pivot joint 33 is adjusted. In the position of the eccentric 51 shown in FIGS. 1, 4 and 5, the central vertical plane 71 of the front frame 14 is disposed at a horizontal angle x to the central vertical plane 72 of the rear frame 16. As illustrated, the rear frame 16 leads the front frame 14 by a lead angle x of 0 degrees 42 minutes, which is the minimum lead angle. When the eccentric 51 is rotated 90 degrees from the minimum lead angle position of FIG. 5 to the intermediate lead angle position shown in FIGS. 6 and 7, the lead angle x is increased to a value of 1 degree and 3 minutes. When the eccentric 51 is pivotally adjusted another 90 degrees from the intermediate lead angle position shown in FIGS. 6 and 7 to the maximum lead angle position of FIG. 8, the lead angle x has a value of 1 degree and 24 minutes. Thus, each 90 degrees of pivotal adjustment of the eccentric provides 21 minutes change in the lead angle x and the total available adjustment between the minimum and maximum lead angle positions of the eccentric 51 provides a 42 minute adjustment in the lead angle x. When the positions of the frames 14 and 16 are considered in relation to the direction of travel, indicated by arrows 73, of the plow during a plowing operation, the horizontal diagonal angle y of the front frame 14 is slightly less than the horizontal diagonal angle z of the rear frame 16.

In order to pivot the eccentric 51 from one position of adjustment to another, the nut 47 is loosened on bolt 46, the capscrew 66 and retainer block 64 are removed from the lever arm 61, the eccentric 51 is pivoted to a new selected position of lead angle adjustment, the block 64 is again fastened to the arm 61 of the eccentric by the capscrew 66 and the nut 47 is tightened on bolt 46. The bottom, end and top surfaces 68, 76, 77 of the rear end of bracket 42 of draft member 38 are so positioned as to have a cooperative abutting relationship with the edge surface 68 of the retainer block 64 when positioned adjacent thereto. The plurality of lead angle adjustments permits the farmer to select the best rear frame lead angle x. The forces imposed on the rear plow frame 16 and draft member 39 during a plowing operation depend on a number of factors such as type of soil, moisture content of the soil, compacted condition of the soil, depth of plowing, number of plow bottoms and travel speed. The forces resisting forward movement of the plow in the direction of travel indicated by arrows 73 will cause the draft members 38 and 39 to resiliently elongate slightly and the rear frame 16 may flex counterclockwise about its pivot joint 32 as viewed from above, as in FIG. 1, whereby the rear frame swings laterally to a new lead angle. This shifting of the rear frame 16 changes the approach angle of the plow bottoms thereon, causing the entire plow to overcut. By selecting the ideal lead angle x, the approach angles of the plow bottoms on the rear section will be substantially the same as the approach angles of the plow bottoms on the front section during a plowing operation.

If the plowing operation is being performed in loose soil at a modest depth, the eccentric position of smallest lead angle is selected. If a greater resistance is encountered as when plowing compacted soil, hardpan, gumbo or at a great depth, it may be desirable to select the eccentric position of largest lead angle. The lead angle position selected would ideally result in a near zero degree lead angle during the plowing operation whereby each plow bottom turns the width of soil for which the plow is designed. The positions of adjustment afforded by the eccentric pivot joint 33 also allows for adjustment due to changes in the number of plow bottoms used on the rear section 13. As illustrated, the rear section main frame 16 is made up of three modules 86, 87, 88 having 1, 2 and 4 plow bottoms, respectively. These modules have their ends releasably secured to one another by bolts and nuts (not shown) to form the rear main frame 16 shown in FIG. 1. A tail wheel assembly 89, including wheels 21 and 22 and their supporting structures, is releasably bolted to the rear end of module 86. The rear frame 16 can be readily modified from the 7 bottom configuration, illustrated in FIGS. 1, to 4, 5 or 6 bottom configurations.

From the foregoing description, it is apparent that this invention provides means to minimize overcut of an articulated plow by adjusting the angle of the rear frame relative to the front frame. This invention avoids the use of additional framework, braces and/or tension rods to reduce lateral flexing of the rear frame, which is believed to be more costly than the structure used in the present invention.

The embodiments of the invention in which an exclusive property or privilege is claimed are defined as follows:

1. An articulated plow comprising
a front section having a diagonal main frame with plow bottoms connected thereto at predetermined intervals,
a rear section having its front end pivotally connected to the rear end of said front section on a transverse horizontal axis and having a diagonal main frame with plow bottoms connected thereto at predetermined intervals, said rear section resiliently flexing laterally and rearwardly about its connection with the front section when subject to the draft forces encountered in a plowing operation, said main frame of said rear section being disposed at a small predetermined horizontal angle to said front section main frame when not engaged in a plowing operation, said horizontal angle being large enough to substantially compensate for said resilient flexing of said rear section during a plowing operation wherein said horizontal angle is reduced thereby minimizing overcut of the plow.

2. The plow of claim 1 and further comprising adjustment means permitting selective adjustment of said horizontal angle between said main frames.

3. The plow of claim 1 wherein said rear plow section is pivotally connected to said front plow section on said transverse horizontal axis by a pair of transversely spaced pivot joints and wherein one of said pivot joints includes an adjustable eccentric operable to change said horizontal angle.

4. The plow of claim 3 wherein said one pivot joint includes a pin secured to one of said sections and a bushing with a radially outward facing cylindrical bearing surface in relatively rotatable bearing engagement with complementary bearing means on the other section and a radially inward facing cylindrical bearing surface in bearing engagement with said pivot pin, said cylindrical bearing surfaces of said bushing defining cylinders with parallel axes disposed a predetermined distance from one another.

5. The plow of claim 4 wherein said bushing includes a radially extending arm and said one pivot joint includes means releasably fastening said arm to said one section in selected positions of rotative adjustment of said bushing.

* * * * *